W. J. CASEY.
INSTANTANEOUS HOSE COUPLING.
APPLICATION FILED MAY 25, 1908.

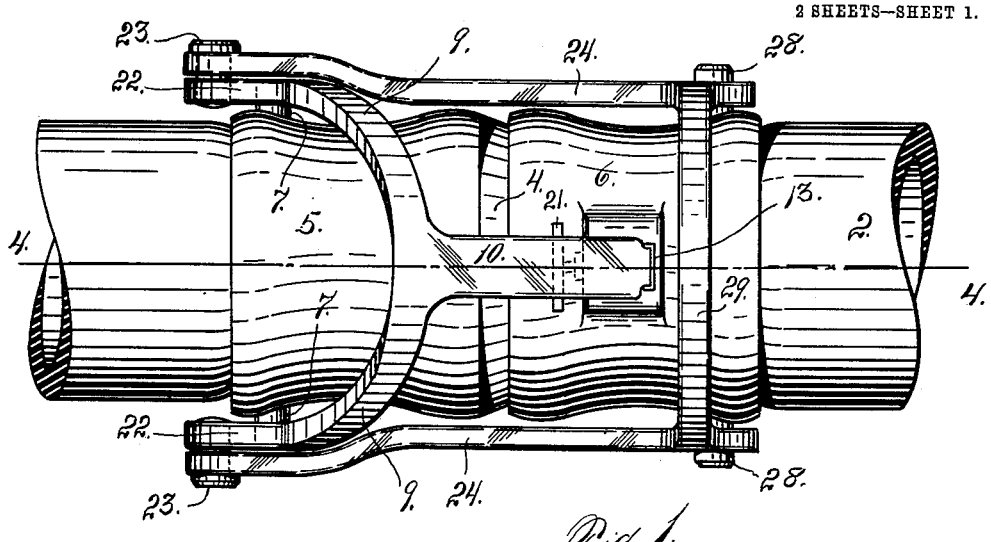
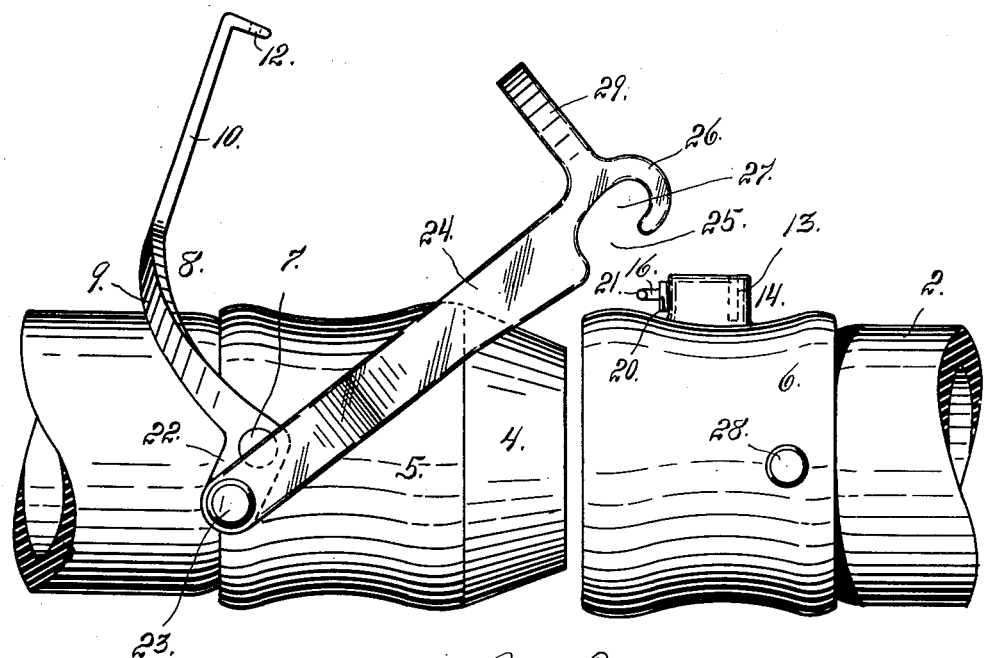

935,587.

Patented Sept. 28, 1909.
2 SHEETS—SHEET 2.

Witnesses
Otto E. Hoddick.
J. D. Thornburgh.

Inventor
W. J. Casey.
By
Attorney

UNITED STATES PATENT OFFICE.

WILLIAM J. CASEY, OF DENVER, COLORADO.

INSTANTANEOUS HOSE-COUPLING.

935,587.　　　　　　Specification of Letters Patent.　　Patented Sept. 28, 1909.

Application filed May 25, 1908. Serial No. 434,975.

*To all whom it may concern:*

Be it known that I, WILLIAM J. CASEY, a citizen of the United States, residing in the city and county of Denver and State of Colorado, have invented certain new and useful Improvements in Instantaneous Hose-Couplers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in hose couplers, my object being to provide a coupler adapted for use either in connecting hose sections or for the purpose of connecting a hose to a hydrant, whereby the coupling operation may be quickly and easily performed.

My improved coupler comprises a lever fulcrumed on one member of the coupling and having arms pivotally connected with hooks adapted to engage lugs formed on the other member of the coupling. In order to perform the coupling operation, it is only necessary to throw the hooks over the lugs and then press upon the actuating arm of the lever whereby a sufficient movement is imparted to the latter to tighten the members to be coupled in the assembled relation. Provision is also made for locking the lever in a position corresponding with the coupled position of the members to be connected whereby it is impossible to accidentally unlock the coupling devices.

Having briefly outlined my improved construction, I will proceed to describe the same in detail reference being made to the accompanying drawing in which is illustrated an embodiment thereof.

Figure 3:
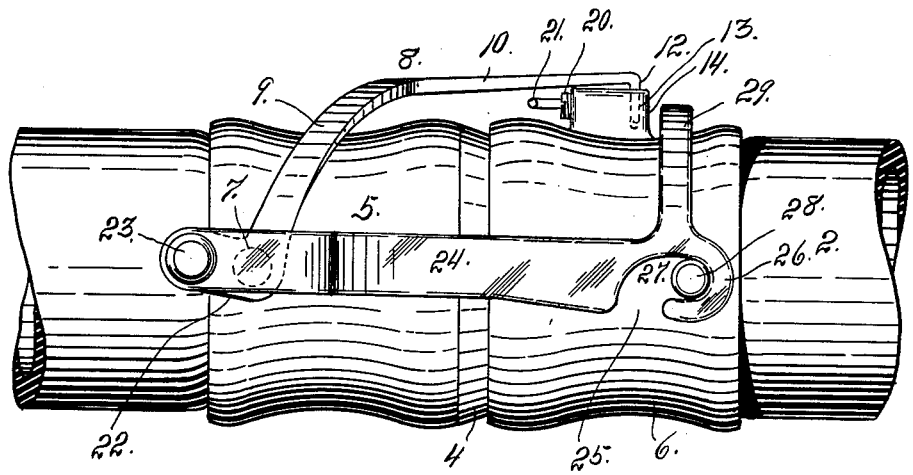
Figure 4:
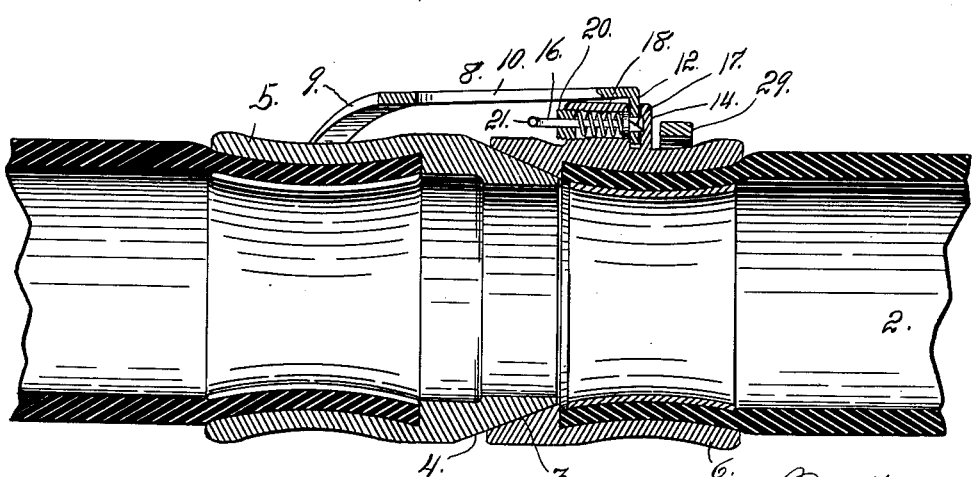
Figure 5:
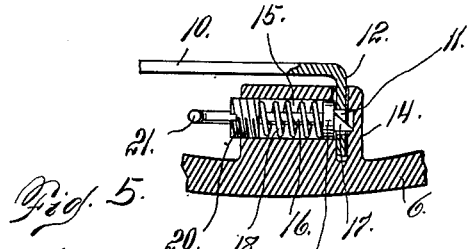

In this drawing, Figure 1 is a top plan view of my improved coupler, the same being shown in the locked or fastened position. Fig. 2 is a side view showing the coupling members disconnected and the coupling devices in a corresponding position. Fig. 3 is a side view illustrating the coupling device in the locked position or that disclosed in Fig. 1. Fig. 4 is a section taken on the line 4—4 Fig. 1. Fig. 5 is a fragmentary view, illustrating the manner of securing the lever in the locked position, the parts being shown on a larger scale.

The same reference characters indicate the same parts in all the views.

Let the numerals 5 and 6 designate the respective hose coupling members. Fulcrumed on lugs 7 formed on the coupling member 5, is a lever 8 having arms 9 adapted to straddle the member 5. The lever is provided with an arm 10 extending forwardly from the junction of the arms 9 and is provided at its forward extremity with a depending apertured projection 12, adapted to enter a recess 13 formed in a lug 14 recessed as shown at 15 to receive a locking bolt 16 terminating in a beveled extremity 17. This bolt is surrounded within the recess 15 with a coil spring 18 interposed between a stop collar 19 formed on the bolt, and a screw plug 20 threaded into the recess. The rear extremity of the locking bolt protrudes beyond the plug 20 and is provided with a pin 21 extending at right angles to the body of the bolt. This pin is of sufficient length to project beyond the arm 10 on both sides, whereby it is accessible for the purpose of unlocking the lever. The hook 12 is provided with an opening 11 adapted to receive the beveled extremity 17 of the bolt. The bevel of the bolt is so arranged that as the hooked end 12 of the lever is inserted in the opening 13, it engages the bevel of the bolt end and forces the latter rearwardly and subsequently springs into the opening in the hook end of the lever thus locking the latter securely in place. The lever is also provided with rearwardly extending short arms 22, which are pivotally connected as shown at 23 with forwardly extending coupling arms 24 terminating at their forward extremities in hooks 26. These forward extremities of the coupling arms are provided with recesses 27 open as shown at 25 to permit the hooks to engage lugs 28 formed on the opposite sides of the coupling member 6. The forward extremities of the two coupling arms are connected by a bow-shaped member 29.

From the foregoing description the use and operation of my improved device will be readily understood. Assuming that the coupling devices are in the position illustrated in Fig. 2 the beveled extremity 4 of the coupling member 5 is inserted in the oppositely beveled end 3 of the coupling member 6. The coupling arms 24 are then thrown downwardly and hooked over the lugs 28 which enter the recesses 27 through the opening 25. The lever 8 is then forced downwardly whereby its hook end 12 is inserted in the opening 13 of the hollow lug 14, and locked in place by the bolt 16 in the manner heretofore explained. During this operation the coupling arms are moved rearwardly whereby the coupling members are forced tightly into engagement with each other, the coupling arms being moved rearwardly sufficiently to cause the lugs 28 to engage the forward portions of the recesses 27 thus locking the coupling members securely in place.

It is evident that the coupling member 6 may either be upon a hose section 2 as shown in the drawing or upon a hydrant as may be desired. From this it will appear that my improved coupling is equally applicable for coupling hose sections, or for connecting a hose with the hydrant as may be desired.

Having thus described my invention, what I claim is:

The combination with the members to be coupled, of a lever having a bifurcated rear portion fulcrumed on opposite sides of one of the coupling members, and having rearwardly extending arms, coupling arms pivotally connected with the rearwardly extending arms, the forward extremities of the coupling arms having elongated recesses which are open to receive lugs with which the opposite coupling member is provided, the coupling member provided with the lugs being also provided with a spring actuated locking bolt, the free extremity of the lever having an apertured projection which the said bolt is adapted to engage when the parts are in the coupled position, substantially as described.

In testimony whereof I affix my signature in presence of two witnesses.

WILLIAM J. CASEY.

Witnesses:
  DENA NELSON,
  ALODIA HUTCHISON.